July 20, 1954
R. A. PIM
2,684,141
HYDRAULIC COUPLING
Filed Nov. 4, 1950
3 Sheets-Sheet 1
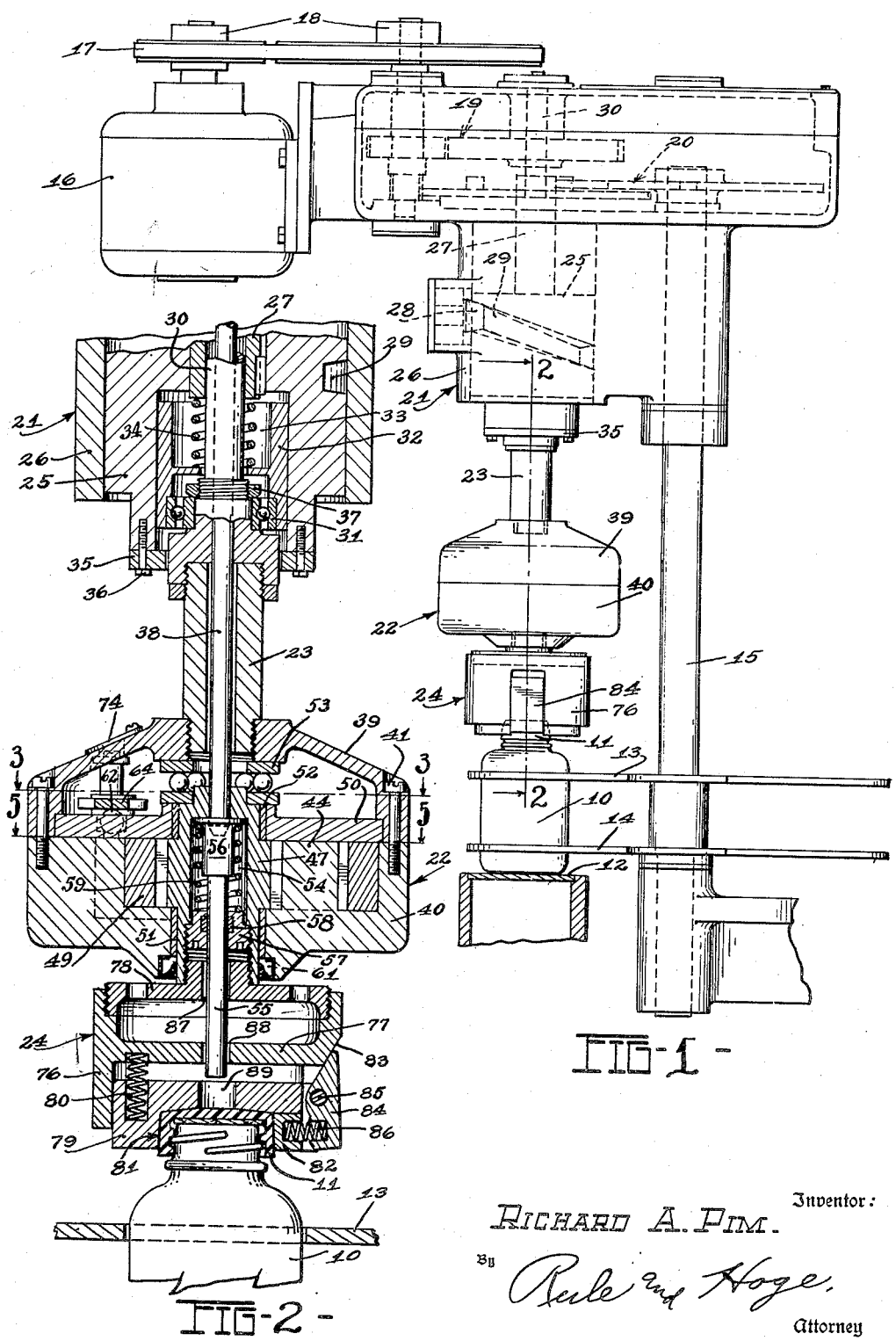
FIG-1-
FIG-2-
Inventor:
RICHARD A. PIM.
By Reile and Hoge,
Attorney

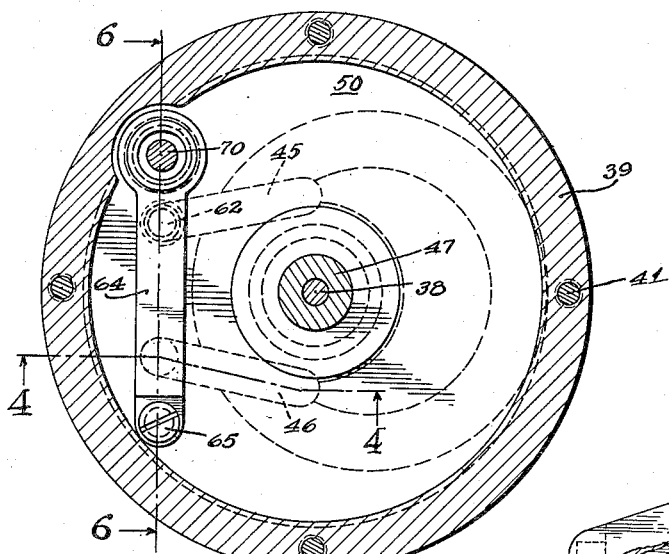
FIG-3-
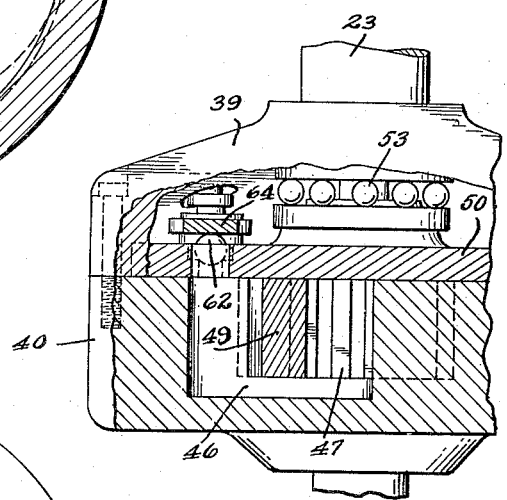
FIG-4-
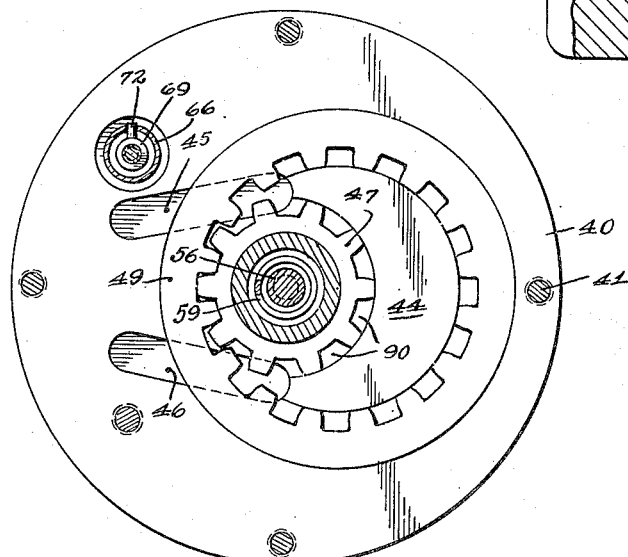
FIG-5-
Inventor:
RICHARD A. PIM.
By Rule and Hoge,
Attorney July 20, 1954  R. A. PIM  2,684,141
HYDRAULIC COUPLING
Filed Nov. 4, 1950  3 Sheets-Sheet 3
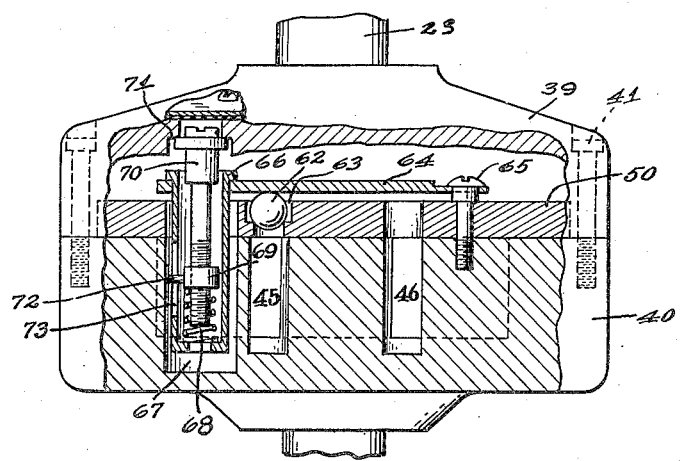
FIG-6-
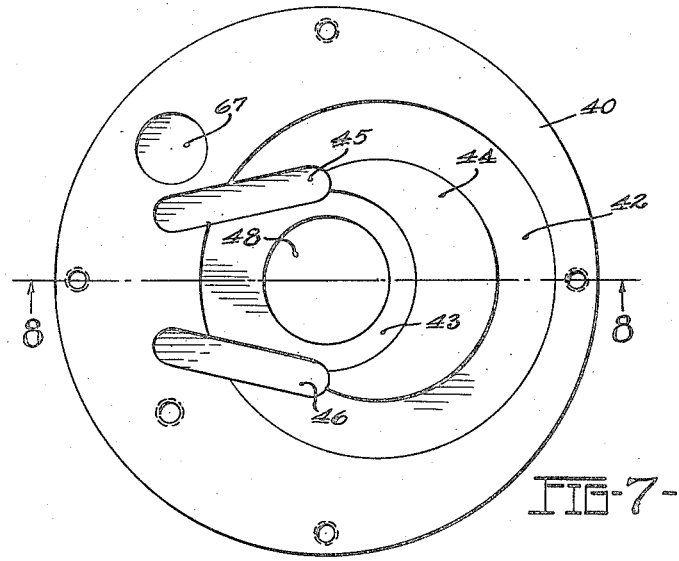
FIG-7-
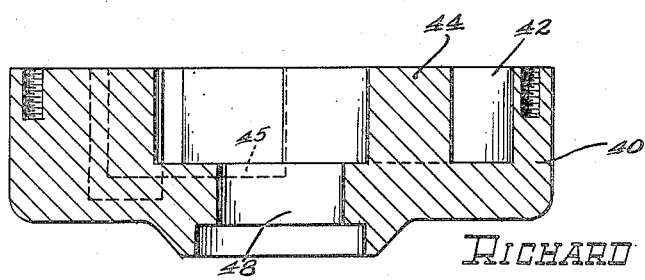
FIG-8-
Inventor:
RICHARD A. PIM.
By Rule and Hoge,
Attorney Patented July 20, 1954

2,684,141

UNITED STATES PATENT OFFICE 2,684,141

HYDRAULIC COUPLING

Richard A. Pim, Toledo, Ohio, assignor to Owens-Illinois Glass Company, a corporation of Ohio Application November 4, 1950, Serial No. 194,061

7 Claims. (Cl. 192—61)

My invention relates to a machine for automatically screwing and tightening caps or closures on bottles, jars or other containers, and more particularly to a hydraulic coupling used in such a machine to provide a torque which can be accurately controlled and maintained within the required limits. My invention is related specifically to such a hydraulic coupling wherein a closure is screwed on the container at a constant speed and is finally tightened under a progressively increasing torque up to a predetermined amount.

My invention further provides for a hydraulic coupling having novel valve control means whereby the torque may be accurately controlled at a predetermined amount.

Referring to the drawings:

Fig. 1 is an elevational view of a machine embodying my invention;

Fig. 2 is a fragmentary sectional view at the line 2—2 on Fig. 1;

Fig. 3 is a sectional view of the hydraulic coupling at the line 3—3 on Fig. 2;

Fig. 4 is a sectional view at the line 4—4 on Fig. 3;

Fig. 5 is a sectional view at the line 5—5 on Fig. 2;

Fig. 6 is a sectional view at the line 6—6 on Fig. 3;

Fig. 7 is a plan view of the hydraulic coupling body with the gears and valve assembly removed; and Fig. 8 is a sectional view at the line 8—8 on Fig. 7.

Referring to Fig. 1, a container 10 with a screw-threaded cap 11 is supported on a belt conveyor 12 by which the containers are brought in succession to the cap sealing station. Each container is positioned beneath the cap sealing apparatus by means of spiders 13 and 14 mounted on a vertical shaft 15. The vertical shaft 15 is intermittently rotated by the action of the motor 16 through the belt 17 and pulleys 18, and through the gearing 19 and the Geneva drive mechanism 20. Such a linkage and mechanism are described in detail in Patent No. 2,559,358 Hullhorst et al., July 3, 1951, Apparatus for Tightening Caps. The gearing and Geneva drive mechanism also serve to operate the cam mechanism 21. The remaining elements on the apparatus comprise a hydraulic coupling assembly 22 which is connected to the cam mechanism by the shaft 23 and a chuck assembly 24 which is fastened to the hydraulic coupling in a manner hereinafter described.

The cam mechanism 21 operates to bring the chuck into engagement with the closure and container and also to provide an increased downward pressure for final sealing. This apparatus is also described in detail in the above identified patent of Hullhorst and Pim. As shown in Fig. 2, cylindrical cam 25 is mounted for limited up-and-down movement in a cam block 26. A tubular shaft 27 is keyed to the cam 25 and is also connected to the gearing 19 in a manner (not shown) so that rotation of the shaft will also rotate the cam. A cam follower roll 28 is set in the wall of the cam block and rides in an endless peripheral cam groove 29 in the cam 25. The cam is thereby caused to move up and down when rotated by the shaft 27. A hollow shaft 30 is provided in telescoping relation to the shaft 27. This shaft is journaled at its lower end with ball bearings 31 mounted in a cage 32 which in turn is seated in a cylindrical recess 33 in the cam 25. The cage 32 has a limited up-and-down movement relative to the cam 25. A coil spring 34 is held under compression between the cage 32 and the lower end of the shaft 27. A ring 35 is fastened to the lower end of the cam by bolts 36 and provides a stop to limit the downward movement of the cage 32. A lock nut 37 serves to hold the ball bearings in position and to lock the cage to the shaft 30. The downward movement of the shaft 27 operates through the spring 34 and the cage 32 to move the shaft 30 in a downward direction. The shaft 30 is also splined at its upper end and geared in a manner (not shown) so that it is continuously rotated at a greater speed than the cam 25. The lower end of the shaft 30 is enlarged and internally threaded for connection with the interconnecting shaft 23.

A rod 38 extends through the shafts 27, 30, and 23 and is rigidly fastened to the machine in a manner not shown. This rod serves to actuate a knock-out pin 55 hereinafter described.

The hydraulic coupling assembly 22 is fastened to the connecting shaft 23 and comprises a cover 39, fastened to a body 40 by means of bolts 41. As shown in Figs. 7 and 8, the body 40 is machined to provide an annular well 42 and circular well 43, thereby forming a crescent shaped wall 44. Channels 45 and 46 are also machined in the body 40 and extend horizontally from the ends of the crescent shaped wall 44 to a point beyond the extreme perimeter of the annular well 42 and then vertically to the top surface of the body 40. Inlet and discharge points are thereby provided for purposes hereinafter described. A center gear 47 is positioned in an opening 48 in the center of the body in concentric relationship with the shafts and an internal ring gear 49 is positioned in the annular well 42 the gears being thereby meshed in eccentric relation (Fig. 5). A gear cover 50 is interposed between the hydraulic coupling cover 39 and body 40. The center gear 47 is journaled for relative rotation in the body 40 by means of a bushing 51 and in the gear cover 50 by means of a bushing 52 (Fig. 2). A thrust bearing 53 is interposed between the cover 39 and the gear 47. The gear 47 is further provided with a cylindrical recess 54 in which a knock-out pin 55 formed with a bushing 56 is positioned. The cylindrical recess is sealed by a nut 57 and an oil seal 58 surrounding the knock-out pin 55. The pin is maintained in its upward position against the rod 38 by a spring 59 interposed between the nut 57 and the bushing 56. A fluid such as oil is maintained in the hydraulic coupling. Leakage at the bottom of the coupling is prevented by an oil seal 61.

As shown in Fig. 6, the hydraulic coupling assembly includes a valve control mechanism which comprises a steel ball 62 seated in an opening 63 in the gear cover 50. This opening is directly over the extreme end of the discharge channel 45. The gear cover 50 is also provided with an opening directly over the extreme end of the inlet channel 46. The ball is maintained in position by means of the leaf 64 which is fastened to the body 40 by the screw 65. The other end of the leaf 64 is maintained under variable spring tension. As shown in Fig. 6 the mechanism for this variable spring tension includes a spring cup or cylinder 66 extending through an opening in the leaf 64 and through the gear cover 50 into a cavity 67 in the body 40. The cup 66 is fastened to the leaf 64 by soldering or other means. A spring 68 is maintained in compression against the bottom of the cup 66 by a spring nut 69, the position of which is adjusted by a stud 70. The stud 70 shoulders in a recess 71 in the cover 39. A projection 72 is provided on the nut 69 and rides in a slot 73 in the spring cup thereby preventing rotation of the spring nut 69. As shown in Fig. 2 a pivoted cover 74 is also provided directly over the valve control mechanism to permit adjustment of the same.

The lower part of the gear 47 is internally threaded to receive a cap gripping chuck. This chuck may be of any conventional design. The chuck assembly 24 (shown in Fig. 2) comprises a cylindrical wall 76 having a horizontal plate 77 interposed between the top and bottom of the cylindrical wall. A top plate 78 is threaded to the upper section of the cylindrical wall and is also threaded to the lower section of the gear 47. A pressure plate 79 is mounted for limited up-and-down movement in the lower section of the cylindrical wall 76 and is maintained in its downward position by a spring 80. The pressure plate is provided with an opening 81 to receive the cap 11. Portions of the pressure plate are cut away and cap gripping elements 82 are provided therein. These elements are mounted for movement horizontally and radially. Portions of the cylindrical wall 76 are also cut away to provide beveled surfaces 83. Arms 84 are pivoted at pins 85 and are maintained in contact with the bevel surfaces 83 by springs 86 interposed between the arms 84 and the elements 82. It can readily be seen that in this chuck, as the downward pressure on the pressure plate increases, the force between the bevel surfaces 83 and the arms 84 also increases, in turn producing a greater pressure against the cap gripping elements 82 and thereby causing the cap to be gripped with a greater force.

The top plate 78, horizontal plate 77, and pressure plate 79 are each provided with openings 87, 88, and 89, respectively, through which the knock-out pin 55 may extend. The knock-out pin being in contact with the rigid rod 38 operates to eject any cap or material which may remain in the chuck after the chuck is retracted to its uppermost position.

The operation of the hydraulic coupling assembly is as follows:

As a container 10 with a screw cap 11 fitted loosely thereon is brought into position by the conveyor belt 12 and held stationary under the cap tightening assembly by spiders 13, 14, the continuously rotating cam 25 lowers the chuck into contact with the cap. Initially, the hydraulic coupling including the gears 47 and 49 and the chuck assembly rotate as an integral unit. As the cap is screwed downward on the bottle neck and engages the top sealing surface of the bottle neck, a comparatively high resistance to further rotation of the chuck is encountered. This resistance also arrests the rotation of the center gear 47 since the chuck is directly connected to said gear. The body 40 continues to rotate and thereby creates a pumping action by its rotation relative to the gear 47. Oil is drawn from the inlet 46, trapped in the pockets 90, and discharged under pressure into the discharge channel 45. Further circulation of the oil is restricted by the valve mechanism acting upon the steel ball 62 sealed over the discharge channel. When the fluid pressure in the discharge channel reaches a predetermined amount, the steel ball is moved out of position and the oil flows into the reservoir. The torque with which the cap is screwed down on the neck is thus determined by the degree of resistance to circulation of the oil. This is controlled by the spring pressure of the spring 68, and may be adjusted by rotating the stud 70.

The operation of the pumping mechanism may be clearly understood by reference to Fig. 5. When the rotation of the gear 47 is arrested, the body 40 and crescent-shaped wall 44 continue to rotate in a clockwise direction relative to the gear 47. Oil is thus drawn from the inlet channel 46, trapped in the pockets 90 by the advancing wall 44 and released from said pockets under pressure into the discharge channel 45. At the same time, the ring gear being set in the body 40 tracks around the arrested gear 47, also in a clockwise direction but at a slower speed, therefore moving in a counterclockwise direction relative to the body 40.

Modifications may be resorted to within the spirit and scope of the appended claims.

I claim:

1. A hydraulic coupling comprising a gear casing, a drive shaft, one end of said casing being connected to the drive shaft, a gear concentric with said casing, a driven shaft passing through the other end of said casing, said gear being connected to the driven shaft, a ring gear set in said casing in mesh with the first gear and in eccentric relation thereto, a crescent-shaped portion of the casing being provided between said gears, a gear cover over said gears, said casing including inlet and discharge channels extending from the ends of said crescent-shaped portion to inlet and outlet openings in said cover, and valve means seated in said outlet and sealing said outlet under variable pressure.

2. A hydraulic coupling comprising a gear casing, a drive shaft, one end of said casing being connected to the drive shaft, a driven shaft concentric with the drive shaft and passing through the other end of said casing, a gear concentric with and connected to the driven shaft, a ring gear set in said casing in mesh with and surrounding the first gear in eccentric relation thereto, a crescent-shaped portion of the casing being provided between said gears, a gear cover over said gears, said casing including inlet and discharge channels extending from the ends of said crescent-shaped portion to inlet and outlet openings in said cover, valve means fitted in said outlet and sealing said outlet under variable pressure, said valve means including a ball set in the said outlet opening in the cover, a flexible leaf over said ball, one end of said leaf being rigidly fastened to said gear covering, and means for holding the other end of said leaf in position under variable tension.

3. A hydraulic coupling comprising a gear casing, a drive shaft, one end of said casing being connected to the drive shaft, a driven shaft concentric with the drive shaft and passing through the other end of said casing, a gear concentric with and connected to the driven shaft, a ring gear set in said casing in mesh with and surrounding the first gear in eccentric relation thereto, a crescent-shaped portion of the casing being provided between said gears, a gear cover over said gears, said casing including inlet and discharge channels extending from the ends of said crescent-shaped portion to inlet and outlet openings in said cover, valve means fitted in said outlet and sealing said outlet under variable pressure, said valve means including a ball set in the said outlet opening in the cover, a flexible leaf over said ball, one end of said leaf being rigidly fastened to said gear covering, and means for holding the other end of said leaf in position under variable tension, the means for holding the other end of the leaf under variable tension including a hollow cylinder fastened to said leaf and extending into an opening in said gear covering and gear casing, a nut and stud extending into said cylinder, and a spring held under compression between the bottom of said cylinder and said nut.

4. A hydraulic coupling comprising a gear casing, a drive shaft, one end of said casing being connected to the drive shaft, a pinion gear concentric with said drive shaft, a driven shaft passing through the other end of said casing and concentric with the drive shaft, said gear being connected to said driven shaft, a ring gear set into said casing in mesh with and surrounding the first gear in eccentric relation thereto, a crescent-shaped portion of the casing being provided between said gears, a gear cover over said gears, said casing including inlet and discharge channels extending from the end of said crescent-shaped portion to inlet and outlet openings in said cover, and valve means seated in said outlet and sealing said outlet under variable pressure.

5. A hydraulic coupling comprising a solid, cylindrical body, a cover fastened to said body and providing a space overlying the body, a drive shaft connected to the cover, said body having a circular well and an annular well formed therein adjacent said space, said circular well being in concentric relationship with the drive shaft, said annular well surrounding said circular well and being in eccentric relationship thereto, thereby forming a crescent-shaped portion in said body, a gear in said circular well, a driven shaft connected to said gear and extending through said body, said gear and driven shaft being rotatable relative to said body, a ring gear set in said annular well in mesh with and surrounding the first gear, a gear cover positioned in juxtaposed relationship to said body and gears between said first cover and said body, said body including inlet and discharge channels extending therethrough from the ends of said crescent-shaped portion to inlet and outlet openings in said gear cover, and valve means fitted in said outlet and sealing said outlet under variable pressure.

6. A hydraulic coupling comprising a solid, cylindrical body, a cover fastened to said body and providing a space overlying the body, a drive shaft connected to the cover, said body having a circular well and an annular well formed therein adjacent said space, said circular well being in concentric relationship with the drive shaft, said annular well surrounding said circular well and being in eccentric relationship thereto, thereby forming a crescent-shaped portion in said body, a gear in said circular well, a driven shaft connected to said gear and extending through said body, said gear and driven shaft being rotatable relative to said body, a ring gear set in said annular well in mesh with and surrounding the first gear, a gear cover positioned in juxtaposed relationship to said body and gears between said first cover and said body, said body including inlet and discharge channels extending therethrough from the ends of said crescent-shaped portion to inlet and outlet openings in said gear cover, valve means fitted in said outlet and sealing said outlet under variable pressure, said valve means including a ball set in said outlet opening in the gear cover, a flexible leaf over said ball, one end of said leaf being rigidly fastened to said gear covering, and means for holding the other end of said leaf in position under variable tension.

7. A hydraulic coupling comprising a solid, cylindrical body, a cover fastened to said body and providing a space overlying the body, a drive shaft connected to the cover, said body having a circular well and an annular well formed therein adjacent said space, said circular well being in concentric relationship with the drive shaft, said annular well surrounding said circular well and being in eccentric relationship thereto, thereby forming a crescent-shaped portion in said body, a gear in said circular well, a driven shaft connected to said gear and extending through said body, said gear and driven shaft being rotatable relative to said body, a ring gear set in said annular well in mesh with and surrounding the first gear, a gear cover positioned in juxtaposed relationship to said body and gears between said first cover and said body, said body including inlet and discharge channels extending therethrough from the ends of said crescent-shaped portion to inlet and outlet openings in said gear cover, valve means fitted in said outlet and sealing said outlet under variable pressure, said valve means including a ball set in said outlet opening in the gear cover, a flexible leaf over said ball, one end of said leaf being rigidly fastened to said gear covering, and means for holding the other end of said leaf in position under variable tension, the means for holding the other end of the leaf under variable tension including a hollow cylinder fastened to the leaf and extending into an opening in the gear cover and the body, a nut and stud extending into said cylinder, and a spring held under compression between the bottom of said cylinder and said nut, said stud extending to and being in contact with the first mentioned cover.

References Cited in the file of this patent

UNITED STATES PATENTS

| Number | Name | Date |
|---|---|---|
| 2,130,317 | Clarke | Sept. 13, 1938 |
| 2,281,292 | Hoover | Apr. 28, 1942 |
| 2,292,146 | Meunier | Aug. 4, 1942 |
| 2,293,786 | Worden | Aug. 25, 1942 |
| 2,358,058 | Crites | Sept. 12, 1944 |
| 2,372,310 | Bowers et al. | Mar. 27, 1945 |
| 2,559,358 | Hullhorst et al. | July 3, 1951 |